United States Patent
Lofstrom et al.

(10) Patent No.: US 10,301,013 B2
(45) Date of Patent: May 28, 2019

(54) BOND FIXTURE FOR COMPOSITE SPLICE CAP ASSEMBLY

(71) Applicant: Sikorsky Aircraft Corporation, Strattford, CT (US)

(72) Inventors: Sven Roy Lofstrom, Irving, TX (US); David Littlejohn, Haslet, TX (US); Eric Boyle, Haslet, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 144 days.

(21) Appl. No.: 15/232,204

(22) Filed: Aug. 9, 2016

(65) Prior Publication Data

US 2018/0044036 A1 Feb. 15, 2018

(51) Int. Cl.
| | | |
|---|---|---|
| *B64C 27/46* | (2006.01) | |
| *B64F 5/10* | (2017.01) | |
| *B64F 5/40* | (2017.01) | |
| *B29C 73/24* | (2006.01) | |

(52) U.S. Cl.
CPC ............... *B64C 27/46* (2013.01); *B64F 5/10* (2017.01); *B64F 5/40* (2017.01); *B23P 2700/01* (2013.01); *B29C 73/24* (2013.01)

(58) Field of Classification Search
CPC ....... B23P 15/04; B23P 6/002; B23P 2700/01; B29C 65/02; B29C 70/46; B29C 33/02; B29C 35/02; B29C 65/00; B29C 73/24; B29L 2031/3076; B64F 5/10; B23K 13/01; G01K 3/01
See application file for complete search history.

(56) References Cited

U.S. PATENT DOCUMENTS

| | | | |
|---|---|---|---|
| 4,855,011 A | * | 8/1989 | Legge .................... B29C 33/02 100/211 |
| 6,197,146 B1 | | 3/2001 | Sucic |
| 6,976,829 B2 | | 12/2005 | Kovalsky et al. |
| 8,012,299 B2 | | 9/2011 | Hancock |
| 8,353,673 B2 | | 1/2013 | Leahy et al. |
| 8,409,389 B2 | | 4/2013 | Jones |
| 9,144,944 B1 | | 9/2015 | White |

* cited by examiner

*Primary Examiner* — Moshe Wilensky
(74) *Attorney, Agent, or Firm* — Cantor Colburn LLP

(57) ABSTRACT

A bond fixture for bonding a component includes a frame defining a chamber for receiving the component. A first pad and a second pad are mounted to the frame. At least one of the first pad and the second pad is movable relative to the frame to adjust a pressure applied to the component. A caul assembly is adapted to be disposed in thermal communication with the component. The caul assembly heats a localized portion of the component.

14 Claims, 7 Drawing Sheets

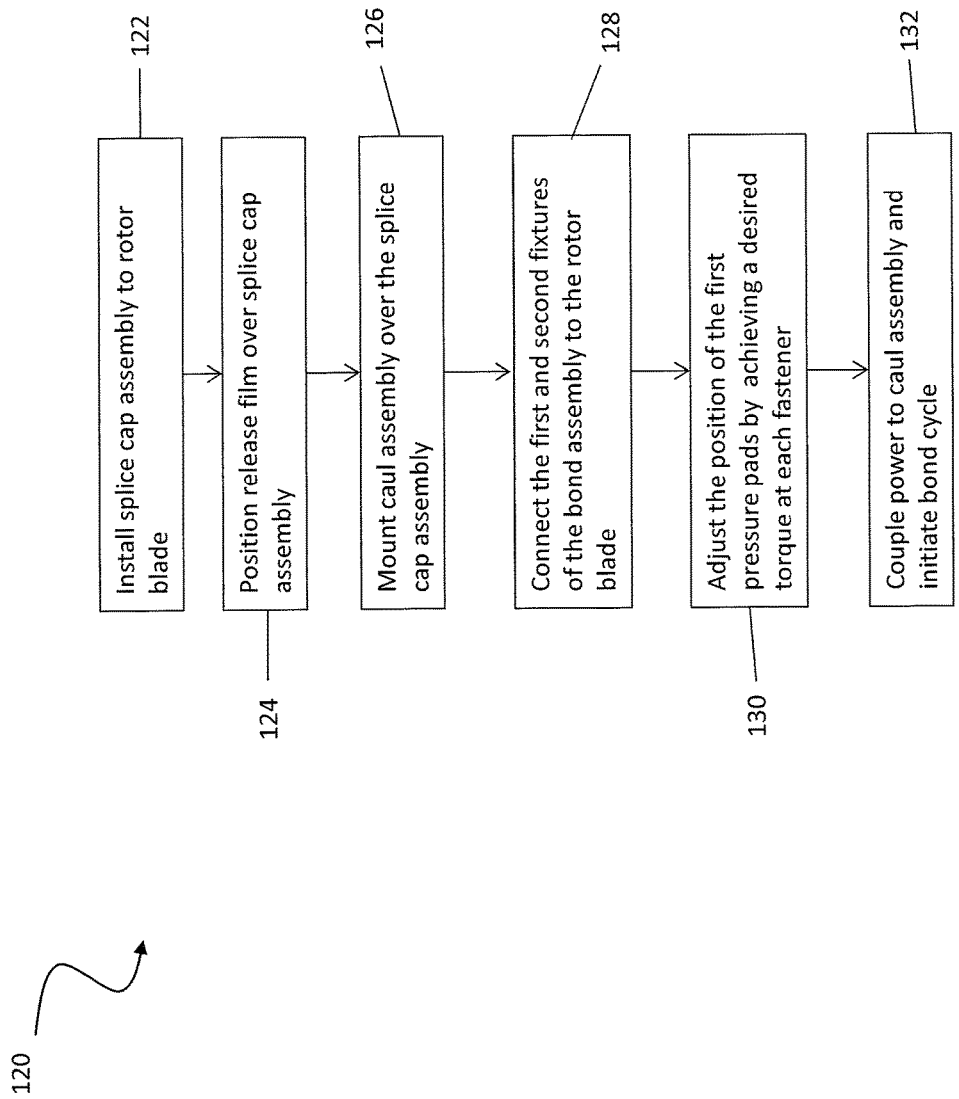

BOND FIXTURE FOR COMPOSITE SPLICE CAP ASSEMBLY

BACKGROUND OF THE INVENTION

Exemplary embodiments of the invention relate to rotary-wing aircraft and, more particularly, to a bond fixture for use during the manufacture or repair of a rotor blade of a rotary-wing aircraft.

Rotary wing aircraft include a plurality of main rotor blades coupled to a central hub. The rotor blades include aerodynamic surfaces that, when rotated, create lift. The configuration of the main rotor blades, particularly the leading edge thereof, is selected to enhance rotor blade performance, for example to increase the hover and lift capabilities of the rotary-wing aircraft. Rotor blades are subjected to high stresses and strains resulting from aerodynamic forces developed during operation.

BRIEF DESCRIPTION OF THE INVENTION

According to one embodiment of the invention, a bond fixture for bonding a component includes a frame defining a chamber for receiving the component. A first pad and a second pad are mounted to the frame. At least one of the first pad and the second pad is movable relative to the frame to adjust a pressure applied to the component. A caul assembly is adapted to be disposed in thermal communication with the component. The caul assembly heats a localized portion of the component.

In addition to one or more of the features described above, or as an alternative, in further embodiments caul assembly includes a heater blanket.

In addition to one or more of the features described above, or as an alternative, in further embodiments the caul assembly further includes an inner caul, and an outer caul. The heater blanket is positioned between the inner caul and the outer caul.

In addition to one or more of the features described above, or as an alternative, in further embodiments the heat applied by the heater blanket to the component is uniform across the component.

In addition to one or more of the features described above, or as an alternative, in further embodiments the heat applied by the heater blanket to the component varies across the component.

In addition to one or more of the features described above, or as an alternative, in further embodiments the wiring of the heater blanket is consolidated and exposed via a leader tab.

In addition to one or more of the features described above, or as an alternative, in further embodiments the bond fixture includes at least one strap for securing the bond fixture to the component.

In addition to one or more of the features described above, or as an alternative, in further embodiments the bond fixture further comprises a trailing edge guard configured to mount to the component opposite the frame.

In addition to one or more of the features described above, or as an alternative, in further embodiments the frame and the trailing edge guard cooperate to affix to the component.

In addition to one or more of the features described above, or as an alternative, in further embodiments a portion the frame includes an inlet within which a portion of the component is receivable.

In addition to one or more of the features described above, or as an alternative, in further embodiments a pad is mounted to the frame and positioned within the chamber, the inlet being formed within the pad.

In addition to one or more of the features described above, or as an alternative, in further embodiments comprising a plurality of frames mounted at various positions over a span of the component, the plurality of frames being interconnected by a first support member.

In addition to one or more of the features described above, or as an alternative, in further embodiments the first pad is coupled to the frame via at least one fastener.

In addition to one or more of the features described above, or as an alternative, in further embodiments a hand knob is coupled to the at least one fastener, the hand knob being adjustable to a desired torque to apply a specific pressure to a component positioned within the chamber.

According to another embodiment, a method of bonding a sheath splice fairing to a rotor blade includes installing a splice cap assembly about the rotor blade and installing a caul assembly in overlapping relationship with the splice cap assembly. A bond fixture is mounted to the rotor blade about the splice cap assembly. The position of one or more pressure pads of the bond fixture are adjusted and localized and constant heat and pressure is applied to the splice cap assembly via the bond fixture.

In addition to one or more of the features described above, or as an alternative, in further embodiments mounting the bond fixture to the rotor blade includes tightening at least one strap about the rotor blade.

In addition to one or more of the features described above, or as an alternative, in further embodiments mounting the bond fixture to the rotor blade further comprises positioning a trailing edge guard about a trailing edge of the rotor blade, opposite the bond fixture and coupling the bond fixture to a trailing edge guard.

In addition to one or more of the features described above, or as an alternative, in further embodiments mounting the bond fixture to the rotor blade further comprises connecting a first strap extending from the frame to a second strap extending from the trailing edge guard.

In addition to one or more of the features described above, or as an alternative, in further embodiments connecting a power source to the caul assembly to apply heat to the splice cap assembly.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7 is a method of bonding a splice cap to a rotor blade according to an embodiment.

The detailed description explains embodiments of the invention, together with advantages and features, by way of example with reference to the drawings.

DETAILED DESCRIPTION OF THE INVENTION

Figure 1:
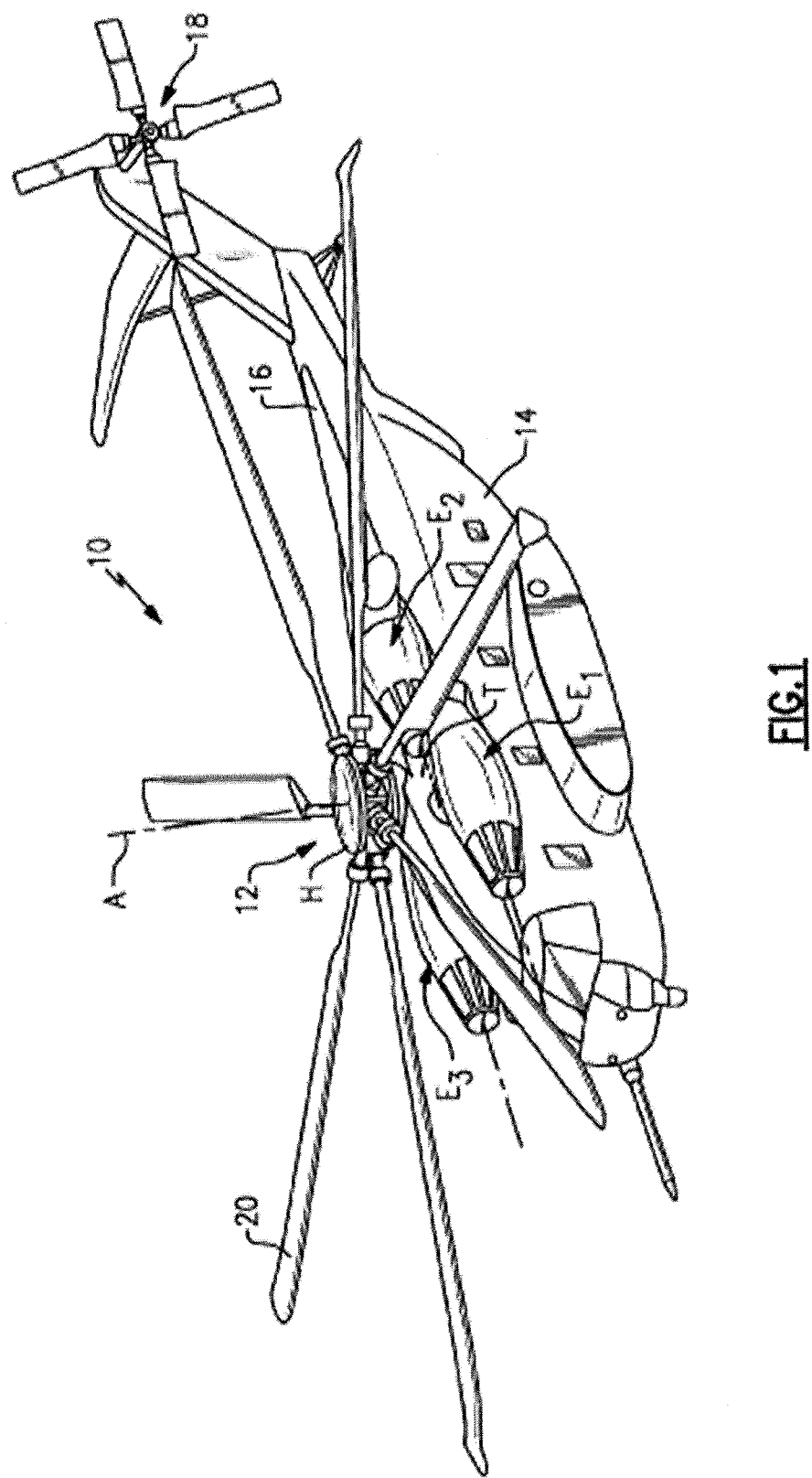
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary-wing aircraft with supplemental translational thrust systems, dual contra-rotating, coaxial rotor system aircraft, turbo-props, tilt-rotors, and tilt-wing aircraft are also within the scope of the invention.

Figure 2:
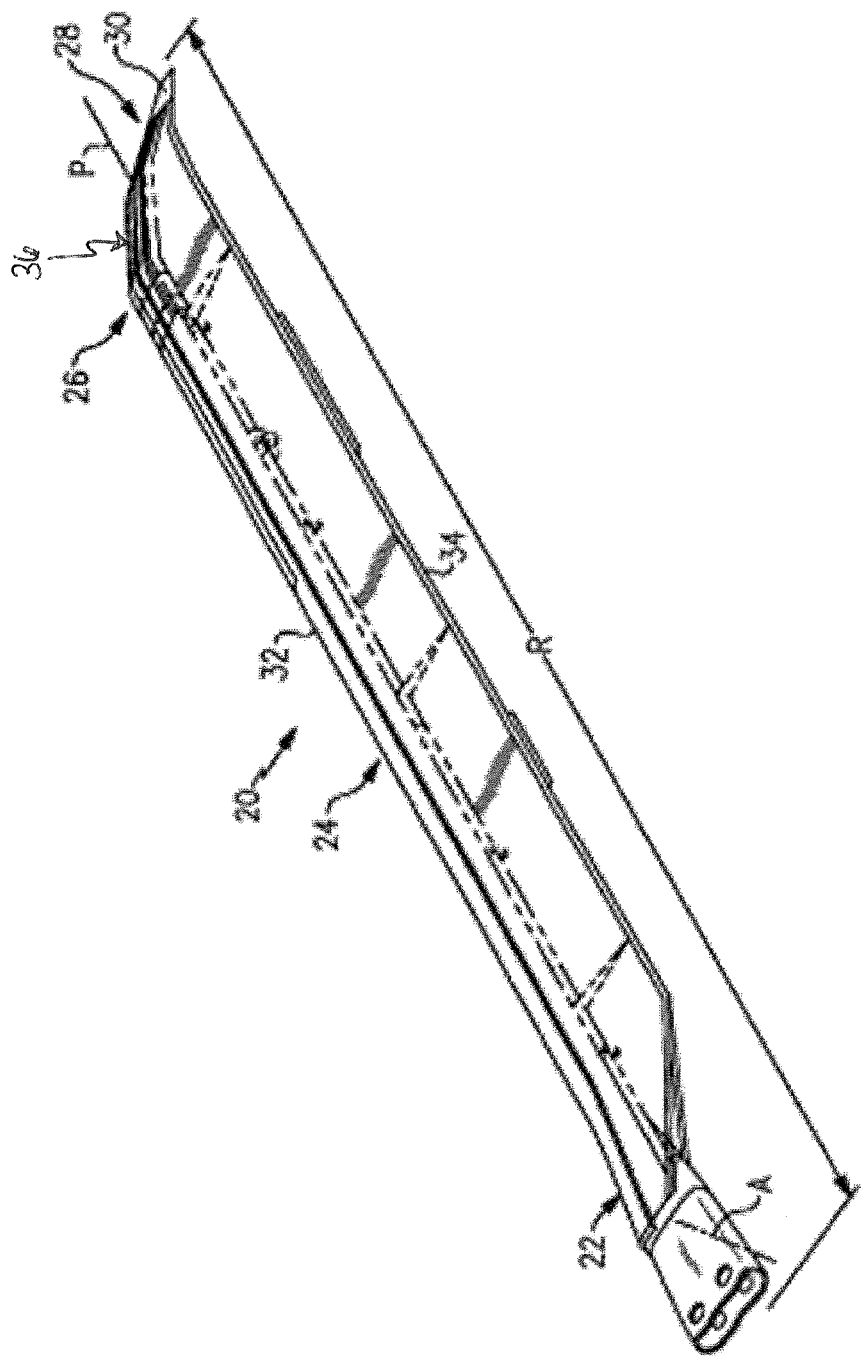
FIG. 2 is a perspective view of an example of a rotor blade of a rotary wing aircraft.

Referring to FIG. 2, each rotor blade assembly 20 of the rotor assembly 12 generally includes a root section 22, an intermediate section 24, a tip section 26, and a tip cap 28. Each rotor blade section 22, 24, 26, 28 may define particular airfoil geometries to tailor the rotor blade aerodynamics to the velocity increase along the rotor blade span. As, illustrated, the rotor blade tip section 26 may include an anhedral form 27; however, any angled or non-angled forms such as cathedral, gull, bent, and other non-straight forms are within the scope of the present invention. The anhedral form 27 as defined herein may include a rotor blade tip section 26 which extends at least partially out of a plane defined by the intermediate section 24.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. A splice cap assembly 36 is generally bonded to leading edge of the tip section 28 of the rotor blade 20.

A bond assembly 40 for bonding the splice cap assembly to the rotor blade 20 is illustrated in FIGS. 3-6. The bond assembly 40 includes a first fixture 50 configured to mount about the leading edge 32 of the rotor blade 20. The first fixture 50 includes one or more generally U or C-shaped frames 52 having a first arm 54 and second arm 56 coupled at a first end thereof. The first and second arm 54, 56, may but need not be substantially identical. In the illustrated, non-limiting embodiment, the first and second arms 54, 56 are arranged parallel to and opposite one another in a generally aligned manner such that the first and second arms 54, 56 are separated by a distance. In an embodiment, a handle 58 is mounted to a portion of the frame 52, such as an exterior surface thereof for example, to aid in installation and removal of the first fixture 50.

The frame 52 defines a chamber 60 within which the leading edge 32 of the rotor blade 20 is positionable. In the illustrated, non-limiting embodiment, a pad 64 is mounted to the portion 62 of the frame 52 coupling the first and second arms 56, 58, within the chamber 60. The pad 64 has an inlet 66 (FIG. 5) formed therein having a contour generally complementary to the leading edge 32 of the rotor blade 20. As a result, when the bond assembly 40 is mounted to a rotor blade 20, the leading edge 32 is disposed within the inlet 66. In other embodiments, the inlet 66 may be integrally formed with the frame 52. It should be understood that the frame 52 illustrated and described herein is intended as an example only and that a frame 52 having another configuration is also within the scope of the disclosure.

In the illustrated, non-limiting embodiment, the first fixture 50 includes a plurality of substantially identical frames 52 mounted at different positions over the span of the rotor blade 20 within the tip section 26. However, in other embodiments, the frame 52 may extend over the span of the rotor blade 20, a distance substantially equal to the splice cap assembly 36.

Connected to, or integrally formed with a first surface 68 of the first arm 54, adjacent the chamber 60, is a first support member 70. In embodiments where the first fixture 50 includes a plurality of frames 52, the first support member 70 is coupled to each of the plurality of frames 52. The first support member 70 may be formed from any suitable material, such as steel or plastic for example.

A plurality of first pressure pads 72 are arranged within the chamber 60 in substantial alignment with the first support member 70. A surface 74 of each first pressure pad 72 is generally complementary to the adjacent portion of the rotor blade 20 that the pressure pad 72 is configured to engage. A plurality of second pressure pads 76 are mounted to a surface 78 of the second arm 56 such that the second pressure pads 76 are also disposed within the chamber 60, opposite the first pressure pads 72 about a rotor blade 20. A surface 80 of each of the plurality of second pressure pads 76 is contoured to conform to a corresponding surface of the rotor blade 20 arranged in contact with the pressure pad 76.

The plurality of second pressure pads 76 are fixed to the second arm 56, but each of the plurality of first pressure pads 72 is movably coupled to the first support member 70. As shown in the illustrated, non-limiting embodiment, at least one threaded fastener 82 extends from the first pressure pad 72 through the first support member 70. Rotation of a hand nut 84 coupled to the at least one threaded fastener 82 can be used to adjust the position of the first pressure pad 72 relative to the first support member 70, and therefore to control the pressure applied by the first and second pressure pads 72, 76 to the rotor blade 20. It should be understood that the threaded fastener 82 configured to adjust the position of the first pressure pad 72 is intended as an example only, and other suitable mechanisms are contemplated herein.

In an embodiment, a caul assembly 86 may be positioned about the leading edge 32 of the rotor blade 20, in overlapping arrangement with the splice cap assembly 36, before the first fixture 50 is mounted to the rotor blade 20. The caul assembly 86 includes an inner caul 88 and an outer caul 90. The inner caul 88 has a contour generally complementary to rotor blade 20 at a position aligned with the splice cap assembly 36 and the adjacent surface of the rotor blade 20. The inner caul 88 is configured to conform the splice cap assembly 36 to a desirable structure. The outer caul 90 has a contour generally complementary to the inner caul 88 and is arranged concentrically with the inner caul 88. When the first fixture 50 is installed about the rotor blade 20, the outer caul 90 is arranged in contact with the first and second pressure pads 72, 76.

Disposed between the outer caul 90 and the inner caul 88 is a heater blanket 92. As a result of this location, the heater blanket 92 is maintained in a more rigid state. Depending on the construction of the heater blanket 92, the heat generated by the heater blanket 92 may be constant, or may vary across at least one of the span and the chord of the rotor blade 20.

In an embodiment, the wiring of the heater blanket 92 is consolidated and exposed via a leader tab 94 extending outwardly from an end 96 of the caul assembly 86. A power supply (not shown) is configured to couple to the leader tab 94 to supply power to and operate the heater blanket 92.

Figure 3:
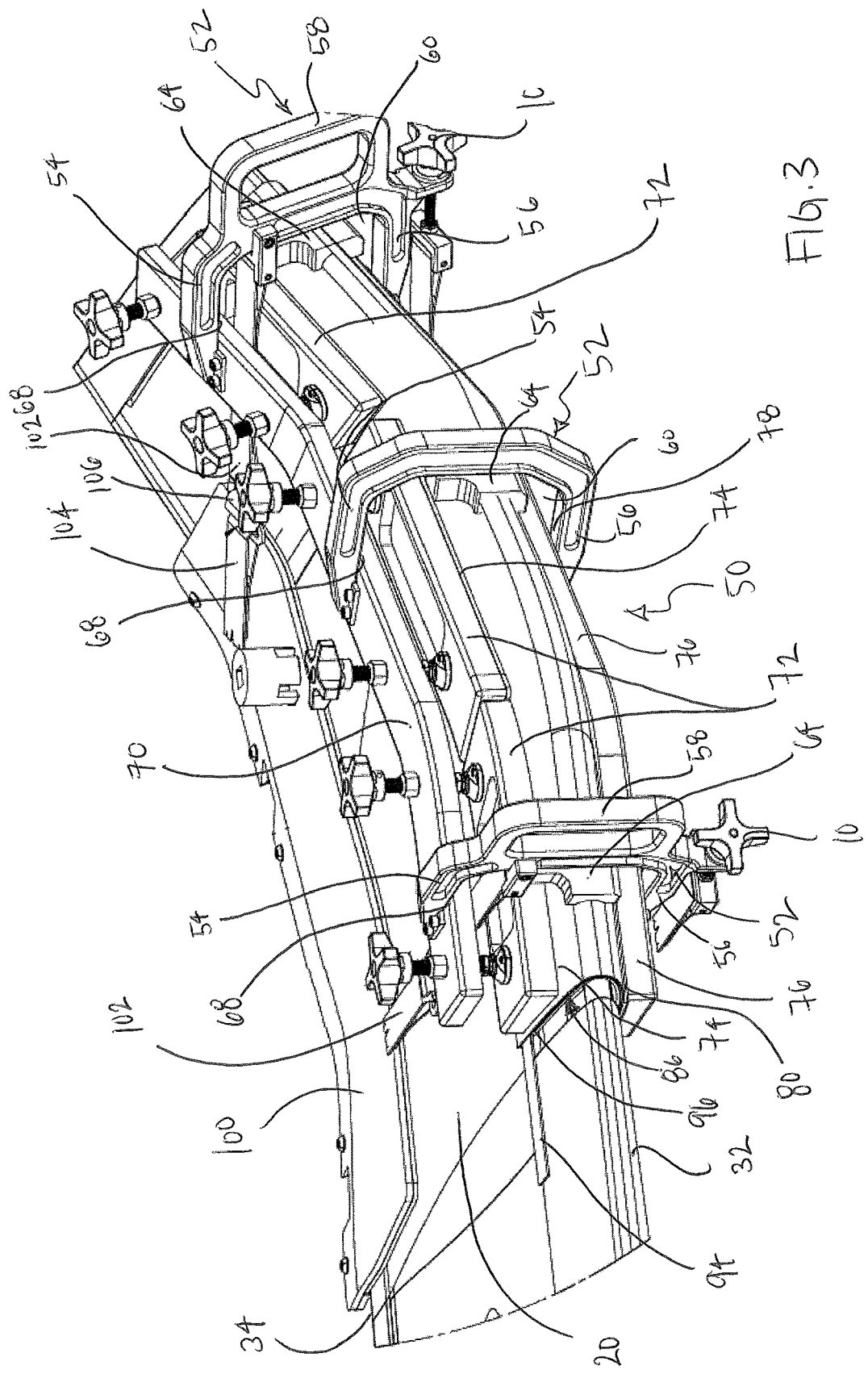
FIG. 3 is a perspective view of a bond assembly mounted to a rotor blade according to an embodiment.
Figure 4:
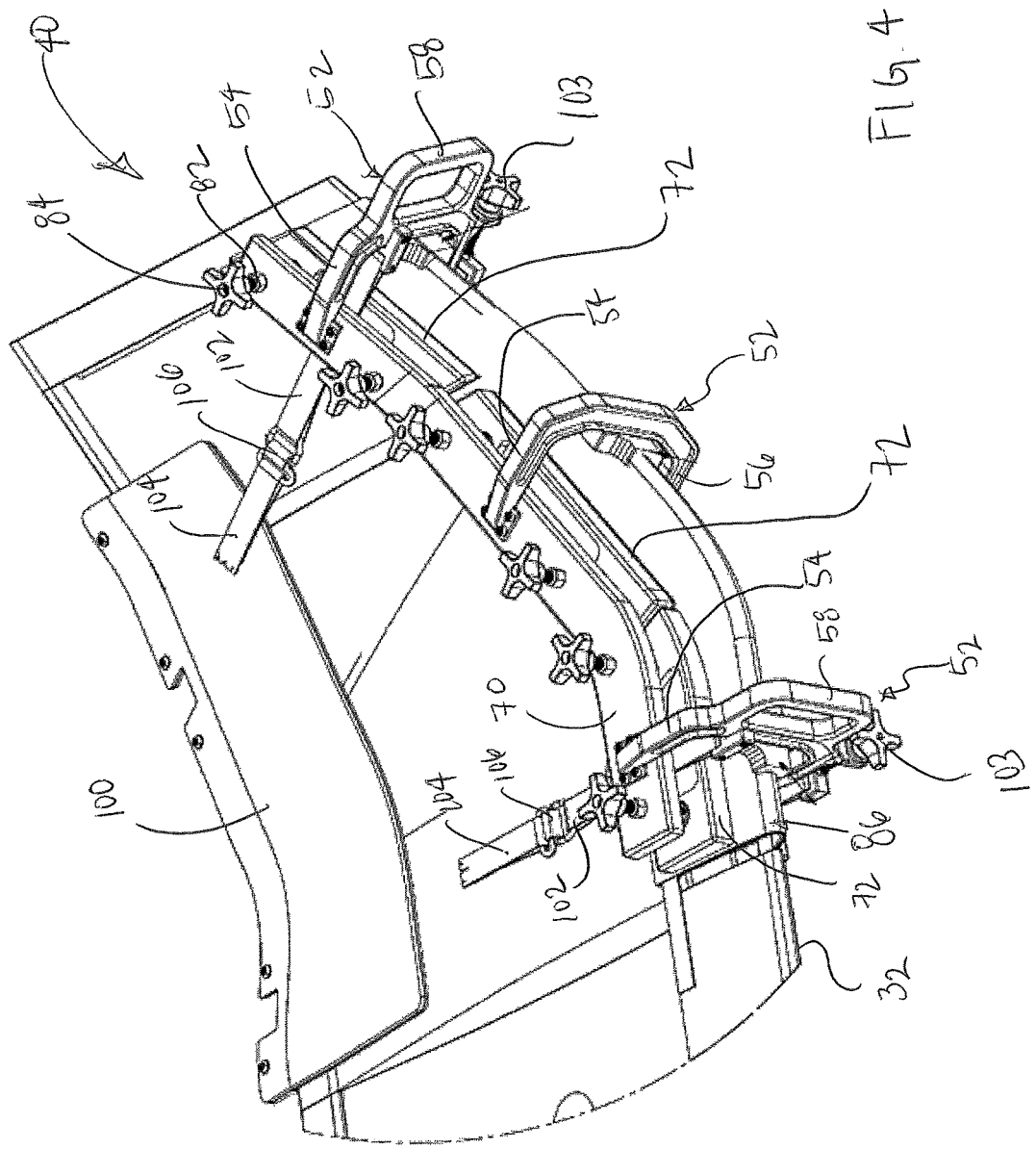
FIG. 4 is a top perspective view of a bond assembly mounted to a rotor blade according to an embodiment.
Figure 5:
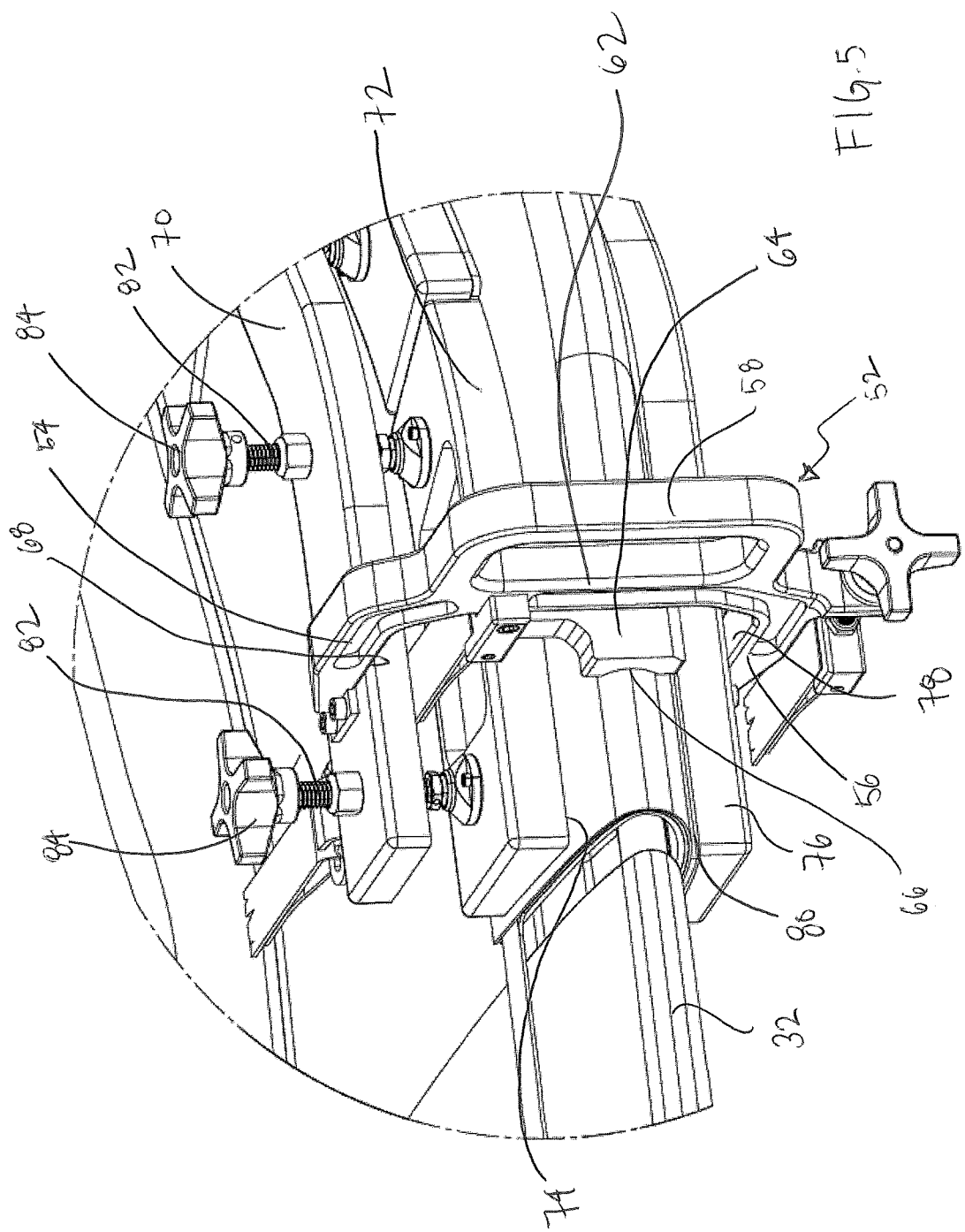
FIG. 5 is a perspective view of a portion of a first fixture of the bond assembly according to an embodiment.
Figure 6:
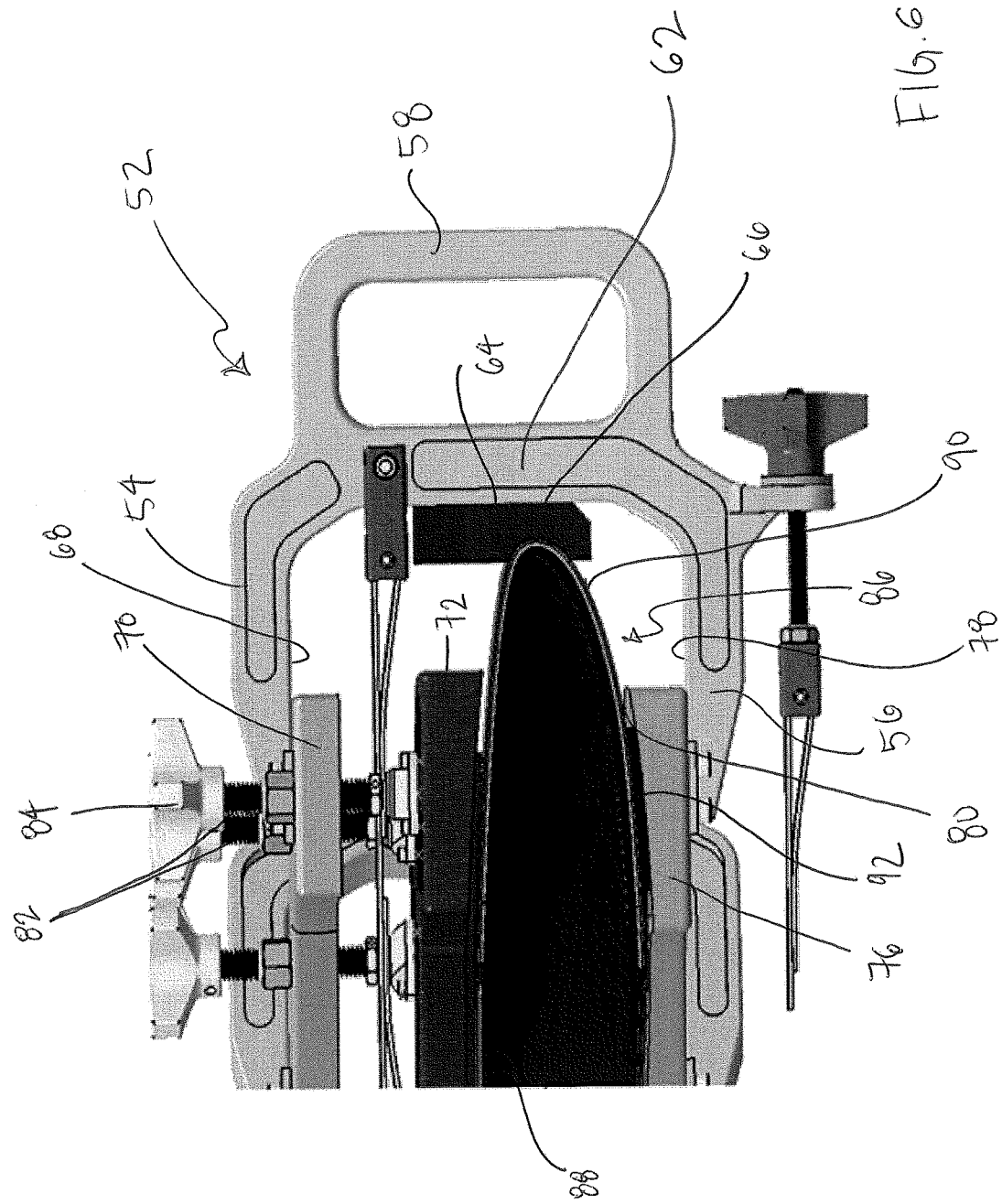
FIG. 6 is a side view of a first fixture of the bond assembly according to an embodiment.

As shown in FIGS. 3 and 4, a second fixture 100, such as a trailing edge guard for example, may be positioned about the trailing edge 34 of the rotor blade 20, generally opposite the bond assembly 40. The trailing edge guard 100 includes an opening (not shown) generally complementary to the trailing edge 34 of the rotor blade 20 at a position substantially aligned with the splice cap assembly 36. An interior of the trailing edge guard 100 may include a resilient liner (not shown), such as rubber for example, such that any pressure applied to the rotor blade 20 via the trailing edge guard 100 does not damage the rotor blade 20.

Extending from the first fixture 50 is at least one strap 102 configured to restrict movement of the first fixture 50 relative to the rotor blade 20. The length of the at least one strap 102 may be adjustable, such as via a knob 103 for example, to tighten and loosen the strap 102 for ease of installation and removal of the bond fixture 50 about the rotor blade 20. In an embodiment, the at least one strap 102 includes a loop connectable at both ends to the frame 52 such that the loop is configured to encircle the rotor blade 20. In embodiments where a trailing edge guard 100 is used in conjunction with the bond fixture 50, the loop may extend about an exterior of the trailing edge guard 100, and in some instances may be received within a passageway formed in the trailing edge guard 100 to restrict sliding movement of the straps 102.

In another embodiment, at least one strap 104 extends from the trailing edge guard 100 corresponding to the at least one strap 102 of the first fixture 50. The free ends of the straps 102 and straps 104 may include complementary portions of a connector 106, such as a hook and D-ring for example, such that corresponding straps 102, 104 may be joined via the connector 106 to restrict movement of both the first fixture 50 and the second fixture 100 relative to the rotor blade 20.

With reference now to FIG. 7, a method 120 of bonding the splice cap assembly 36 to the rotor blade 20 includes installing the splice cap assembly to the leading edge of the rotor blade, as shown in block 122. In block 124, a release film is installed over the splice cap assembly and is secured in place relative to the rotor blade. A heated caul assembly is then positioned on the leading edge of the rotor blade, as shown in block 126, in overlapping arrangement with the splice cap assembly and the release film. In block 128, the second fixture 100 is mounted to the trailing edge 34 of the rotor blade 20, and the first fixture 50 is mounted about the leading edge of the rotor blade 20. An outboard end of the first fixture 50 is aligned with an outboard end of the caul assembly 86, and the first fixture 50 and the second fixture 100 are positioned generally opposite one another about the rotor blade 20. Mounting the first and second fixtures 50, 100 may include installing the at least one strap 102, or coupling together straps 102 and 104, and tightening said straps to prevent movement of the first and second fixtures 50, 100 relative to the rotor blade 20. In block 130, the plurality of first pressure pads 76 are moved into contact with the rotor blade 20 and caul assembly 86 to apply a desired pressure to the rotor blade 20. In an embodiment, this positioning of the first pressure pads 76 includes adjusting a nut or hand knob 84 associated with each threaded fastener 82 to a desired torque. In block 132, the leader tab extending from the caul assembly is coupled to a controller, such as via a plurality of power cables for example, and the bond cycle is initiated.

The bond assembly 40 illustrated and described herein provides localized heat and pressure to a desired area of the rotor blade, specifically to the tip section 28 where the splice cap assembly 36 is located. The small size of the bond assembly 40 allows the bonding process to be performed in a fixed location without requiring movement to a separate location to cure. As a result, the need for a large walk-in oven to cure components of the blade 20 is eliminated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A bond fixture for bonding a component comprising:
   a plurality of frames mounted at various positions over a span of the component, the plurality of frames being interconnected by a first support member, wherein each frame of the plurality of frames defines a chamber for receiving the component;
   a first pad mounted to at least one of the plurality of frames;
   a second pad mounted to at least one of the plurality of frames, wherein at least one of the first pad and the second pad is movable relative to the frame to adjust a pressure applied to the component; and
   a caul assembly adapted to be disposed in thermal communication with the component, wherein the caul assembly heats a localized portion of the component.

2. The bond fixture according to claim 1, wherein the caul assembly includes a heater blanket.

3. The bond fixture according to claim 2, wherein the caul assembly further includes an inner caul, and outer caul, the heater blanket being positioned between the inner caul and the outer caul.

4. The bond fixture according to claim 2, wherein the heat applied by the heater blanket to the component is uniform across the component.

5. The bond fixture according to claim 2, wherein the heat applied by the heater blanket to the component varies across the component.

6. The bond fixture according to claim 2, wherein the wiring of the heater blanket is consolidated and exposed via a leader tab.

7. The bond fixture according to claim 1, wherein the bond fixture includes at least one strap for securing the bond fixture to the component.

8. The bond fixture according to claim 1, wherein the bond fixture further comprises a guard configured to mount to the component opposite the plurality of frames.

9. The bond fixture according to claim 8, wherein the plurality of frames and the guard cooperate to affix to the component.

10. The bond fixture according to claim 1, wherein a portion the plurality of frames includes an inlet within which a portion of the component is receivable.

11. The bond fixture according to claim 10, wherein a pad is mounted to at least one of the plurality of frames at a position within the chamber, the inlet being formed within the pad.

12. The bond fixture according to claim 1, wherein the first pad is coupled to the frame via at least one fastener.

13. The bond fixture according to claim 1, wherein a hand knob is coupled to the at least one fastener, the hand knob being adjustable to a desired torque to apply a specific pressure to a component positioned within the chamber.

14. A bond fixture for bonding a component comprising:
a plurality of frames mounted at various positions over a span of the component, the plurality of frames being interconnected by a first support member, each of the plurality of frames defining a chamber for receiving the component;
a first pad mounted to at least one of the plurality of frames;
a second pad mounted to the at least one of the plurality of frames, wherein at least one of the first pad and the second pad is movable relative to the plurality of frames to adjust a pressure applied to the component; and
a caul assembly configured to heat a localized portion of the component, wherein the bond fixture is operable to bond a component to a rotor blade by:
installing the component about the rotor blade;
installing a caul assembly in overlapping relationship with the first component;
mounting the bond fixture to the rotor blade about the first component; and
adjusting a position of one or more pressure pads of the bond fixture; and
applying localized and constant heat and pressure to the first component via the bond fixture.

* * * * *